United States Patent
Florent et al.

(10) Patent No.: US 6,399,682 B2
(45) Date of Patent: *Jun. 4, 2002

(54) TEMPERATURE STABLE AND SUNLIGHT PROTECTED PHOTOCHROMIC ARTICLES

(75) Inventors: Frederic Henri Florent, Samoreau; David Henry, Saint-Michel S/Orge; Andre Jean Vachet, Montigny S/Loing; Jacques Jean Vial, Noisy S/Ecole, all of (FR)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/791,312

(22) Filed: Feb. 22, 2001

Related U.S. Application Data

(63) Continuation of application No. 09/426,655, filed on Oct. 25, 1999, now Pat. No. 6,262,155, which is a continuation of application No. 08/817,561, filed as application No. PCT/US95/14652 on Nov. 9, 1995, now Pat. No. 5,973,039.
(60) Provisional application No. 60/000,829, filed on Jul. 28, 1995.

Foreign Application Priority Data

Dec. 12, 1994 (FR) .............................. 94 14933

(51) Int. Cl.[7] .................................. C08K 5/34
(52) U.S. Cl. ...................................... 524/100
(58) Field of Search ........................ 524/100

(56) References Cited

U.S. PATENT DOCUMENTS

| 4,912,014 A | 3/1990 | Feldman |
|---|---|---|
| 4,957,843 A | 9/1990 | Hipps |
| 5,330,686 A | 7/1994 | Smith |
| 5,516,621 A | 5/1996 | Tsuda |
| 5,552,090 A | 9/1996 | VanGemert |
| 5,585,042 A | 12/1996 | Knowles |
| 5,621,017 A | 4/1997 | Kobayakawa |
| 5,645,767 A | 7/1997 | VanGemert |
| 5,651,923 A | 7/1997 | Kumar |
| 5,656,206 A | 8/1997 | Knowles |

FOREIGN PATENT DOCUMENTS

| DE | 40 10 783 A1 | 10/1991 |
|---|---|---|
| EP | 0142921 | 5/1985 |
| FR | 2431511 | 2/1980 |
| WO | WO-A-92/05209 | 4/1992 |

*Primary Examiner*—Paul R. Michl
(74) *Attorney, Agent, or Firm*—Angela N. Nwaneri; Peter Rogalskyj

(57) ABSTRACT

The invention relates to photochromic transparent organic materials particularly useful for the production of photochromic organic ophthalmic lenses. The material includes an optical-quality polymer matrix and at least one coloring agent giving photochromic properties to the matrix. The coloring agent is chosen from the group of the spirooxazins the spiropyrans, and the chromenes. The polymer of the matrix is chosen from the group of homopolymers of ethyoxylated bisphenol A dimethacrylate with formula I:

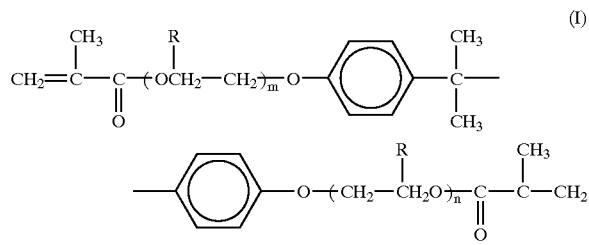

in which R is H or $CH_3$, and m and n independently represent 1 or 2, and of the copolymers of this dimethacrylate containing at most 30 wt % of an aromatic monomer with vinyl, acrylic or methacrylic functionality.

16 Claims, No Drawings

TEMPERATURE STABLE AND SUNLIGHT PROTECTED PHOTOCHROMIC ARTICLES

The present application is a continuation of U.S. patent application Ser. No. 09/426,655, filed Oct. 25, 1999, now U.S. Pat. No. 6,262,155, which is a continuation of U.S. patent application Ser. No. 08/817,561, filed Apr. 21, 1997, now U.S. Pat. No. 5,973,039, which is a 371 of PCT/US95/14652, filed Nov. 9, 1995, which claims the benefit of U.S. Provisional patent application Ser. No. 60/000,829, filed Jul. 28, 1995, and of French Patent Application No. 94 14933, filed Dec. 12, 1994.

FIELD OF THE INVENTION

The invention relates to new photochromic transparent organic materials with a high refractive index, to a process for their preparation, and to the articles made of these materials.

BACKGROUND OF THE INVENTION

It is difficult to find a photochromic material allowing for the production of an ophthalmic lens whose transmittance varies as a function of the lighting. Outside of their photochromic properties (i.e., colorability, rapid darkening and lightening kinetics, acceptable durability, etc.), such lenses are generally made by the use of appropriate mixtures of photochromic compounds such as spirooxazines and chromenes. The polymer matrixes which are used, though thermally crosslinked, have a low glass transition point, generally lower than that of CR39®, a reference ophthalmic resin consisting of diethylene glycol bis(allyl carbonate) available from PPG Industries, so as to have rapid photochromic kinetics. Moreover, these polymers generally have a relatively low refractive index (<1.54).

The majority of these thermally crosslinked matrixes are obtained by radical polymerization (i.e., polymerization which most often can only be carried out provided that one uses initiators of the organic peroxide type.) The use of organic peroxides makes it practically impossible to incorporate photochromic molecules in the mixture of monomers before polymerization, the peroxides having the effect either of destroying any photochromic effect or of giving the product an unacceptable permanent intense coloration. Also, one is obliged to later incorporate coloring agents into the matrix, most often by a special thermal diffusion process.

Therefore, there continues to be a need for photochromic trans-parent organic materials which have improved photochromic properties and which are easy to manufacture and not very expensive to manufacture.

SUMMARY OF THE INVENTION

Briefly, the invention relates to new photo-chromic trans-parent organic materials which are particularly useful for the production of photochromic organic ophthalmic lenses. The organic material consists of an optical-quality polymer matrix and at least one coloring agent giving photochromic properties to the matrix. The coloring agent is chosen from the group of the spirooxazines, the spiropyrans, and the chromenes. The polymer of the matrix is chosen from (a) homopolymers of ethyoxylated bisphenol A dimethacrylate having formula I:

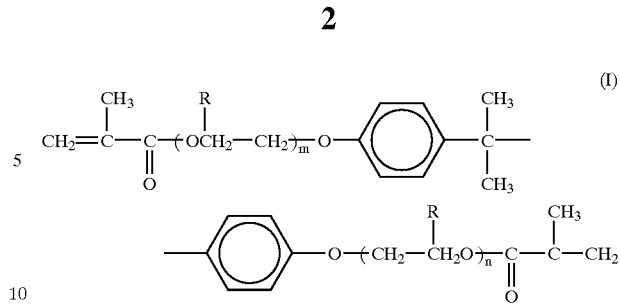

in which R is H or $CH_3$, and m and n independently represent 1 or 2, and (b) copolymers of ethoxylated bisphenol A dimethacrylate containing, at most, 30 wt % of at least one aromatic monomer with vinyl, acrylic, or methacrylic functionality.

Surprisingly, we have found that the materials of the invention are characterized particularly by a glass transition point, and therefore by a hardness, which is greater than that of many hitherto known organic ophthalmic products without any adverse effects on the darkening and lightening speeds. We have also found that, through the choice of an appropriate mixture of several coloring agents, it is possible to obtain the desired tint in such matrixes, particularly gray or brown, with this tint practically not varying in the course of darkening and lightening.

The inventive organic materials also exhibit a high refractive index, which is in all cases greater than 1.54, and which can be adjusted, if necessary, to the desired value by the use of an appropriate modifying comonomer.

Useful co-monomers for the invention include vinyl, acrylic or methacrylic compounds containing in their formula one or more benzene nuclei. Examples of some useful co-monomers are, divinylbenzene, diallyl phthalate, benzyl or naphthyl acrylates or methacrylates, etc., as well as their derivatives substituted on the aromatic nucleus or nuclei by chlorine or bromine atoms.

In another aspect, the invention also relates to a process for the preparation of the photochromic organic materials of the invention by polymerizing an ethoxylated bisphenol A dimethacrylate, corresponding to formula I:

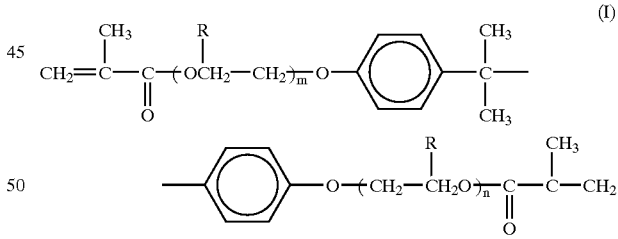

in which R is H or $CH_3$, and m and n independently represent 1 or 2, optionally with up to 30 wt % of one or more modifying aromatic monomers with vinyl, acrylic or methacrylic functionality, in the presence of a diazo radical initiator and in the absence of a peroxide radical initiator. Preferably, R is H, and m=n=2.

Preferably, the polymerization is carried out in the presence of at least one photochromic coloring agent, which allows one to color the final material in its mass.

DETAILED DESCRIPTION OF THE INVENTION

An essential characteristic of the present process is that it is implemented in the absence of a peroxide radical initiator, the latter being replaced by a diazo initiator. This has the advantage of allowing one to incorporate the photochromic coloring agent in the resin matrix before polymerization of the matrix. Polymerization in the presence of the coloring agent cannot be carried out with a peroxide initiator because the latter may generate a strong initial coloration of the resulting organic glass. The peroxide initiator may also lead to a loss of the photochromic effect. Accordingly, in current processes for the production of organic glasses, when a peroxide initiator is used, a separate coloration step is required in order to re-impart photochromic properties or color back into the glass. As stated earlier, the coloration is generally done for example, by the diffusion of the coloring agent or agents into the glass matrix, usually at elevated temperatures. The preferred inventive process avoids this additional coloring step, and if desired, allows for the production of a photochromic lens in a single step by carrying out the polymerization directly in a lens mold.

Of course, if desired, the coloring agent can be omitted from the polymerizable mixture, and the incorporation of the photochromic coloring agent or agents in the polymerized matrix can be carried out by a conventional thermal diffusion process as described for example, in U.S. Pat. Nos. 5,130,353, 5,185,390 and 5,180,254. According to the method described in these references, a substrate impregnated with photochromic coloring agent or agents is applied to one surface (usually the convex surface in the case of a lens) of the polymer matrix. The impregnated substrate is then heated to 100–150° C. for one to three hours, and finally the substrate is separated from the polymer matrix.

The photochromic coloring agent can be chosen from the general classes of the spirooxazines, spiropyrans and chromenes having photochromic properties. Quite a large number of photochromic coloring agents are described in the literature and are commercially available and are described for example in U.S. Pat. Nos. 5,246,630 and 4,994,208, both herein incorporated by reference.

Examples of useful spirooxazines for the invention are described in U.S. Pat. Nos. 3,562,172; 4,634,767; 4,637,698; 4,720,547; 4,756,973; 4,785,097; 4,792,224; 4,784,474; 4,851,471; 4,816,584; 4,831,142; 4,909,963; 4,931,219; 4,936,995; 4,986,934; 5,114,621; 5,139,707; 5,233,038; 4,215,010; 4,342,668; 4,699,473; 4,851,530; 4,913,544; 5,171,636; 5,180,524; and 5,166,345, and also in EP-A 0,508,219; 0,232,295; and 0,171,909, among others, herein incorporated by reference.

Examples of chromenes that can be used are described also in U.S. Pat. Nos. 3,567,605; 4,889,413; 4,931,221; 5,200,116; 5,066,818; 5,244,602; 5,238,981; 5,106,998; 4,980,089; and 5,130,058 and EP-A 0,562,915, all herein incorporated by reference.

Useful spiropyrans have been described in the literature, for example, in *Photochromism,* G. Brown, Ed., Techniques of Chemistry, Wiley Interscience, Vol. III, 1971, Chapter III, pp. 45–294, R. C. Bertelson; and *Photochromism. Molecules & Systems,* Edited by H. Dürr, H. Bouas-Laurent, Elsevier, 1990, Chapter 8, "Spiropyrans," pp. 314–455, R. Guglielmetti, all herein incorporated by reference.

On an indicative and nonlimiting basis, the proportion of photochromic coloring agent(s) to be incorporated in the matrix can range from 0.03 to 0.3 wt %, and preferably from 0.05 to 0.1 wt %.

Preferably also, one uses a combination of photochromic coloring agents giving a gray or brown tint in the darkened state.

As diazo radical initiator, it is possible to use azobisisobutyronitrile (AIBN) and 2,2'-azobis(2-methylbutyronitrile), among others. Other examples of useful diazo radical initiators are also described in "Polymer Handbook," by Bandrup and Immergut, p. II-2, John Wiley (1989).

To carry out the polymerization, it is possible, for example, to heat the polymerizable mixture slowly until the beginning of thermal degradation of the diazo compound with release of nitrogen and free radicals. This can occur at a relatively low temperature which depends on the diazo compound which is used (approximately 65° C. in the case of AIBN). The polymerization is carried out for several hours, for example, 10–20 hours. One finally proceeds to anneal the structure by heating in successive temperature stages, which can exceed 100° C., and for a duration of approximately 1 hour each.

The invention finally relates to the articles consisting completely or partially of a photochromic organic material according to the invention.

Nonlimiting examples of such articles are lenses for ophthalmic (corrective) glasses or sunglasses, windows for automobiles and other vehicles, windows for buildings, etc. In the articles of the invention, the photochromic organic material of the invention can constitute the whole thickness of the article (solid article) or can be in the form of a film or layer stratified on a transparent organic or mineral support.

Lenses, especially ophthalmic lenses, are particularly preferred articles of the invention.

These lenses can be produced conveniently by carrying out the polymerization in lens molds, in a conventional manner, for example, as described in U.S. Pat. Nos. 2,242,386; 3,136,000; and 3,881,683 which are herein incorporated by reference.

The stratified articles can be produced easily by application of the polymerizable mixture (for example, by immersion, by centrifugation, by brush, etc.) to the support and polymerization of said mixture in situ.

EXAMPLES

In order to suitably understand the invention, the following nonlimiting examples are given. The parts are parts by weight.

Example 1

(Reference)

Two non-photochromic organic glasses are prepared by the following mode of operation:

A) 100 parts of Diacryl 121 (tetraethoxylated bisphenol A dimethylmethacrylate (formula I in which $R_1=CH_3$, $R_2=H$, and $m=n=2$) sold by the AKZO Company) is mixed with 0.25 part azobisisobutyronitrile (AIBN) as initiator. The mixture is polymerized in a lens mold for 16 hours at 65° C. in a nitrogen atmosphere. The resulting mold is posthardened for 1 hour at 70° C., for 1 hour at 80° C. and for 1 hour at 110° C. so as to obtain an organic lens after removal from the mold.

B) In this second stage, operation A is repeated except that the Diacryl 121 is replaced by Diacryl 101 (diethoxylated bisphenol A dimethylmethacrylate (formula I in which $R_1=CH_3$, $R_2=H$, and $m=n=1$) sold by the AKZO company).

The physical properties of these glasses, as well as those of a reference organic glass commercially available under the registered brand CR39® and consisting of the homopolymer of diethylene glycol bis(allyl carbonate), are indicated in Table I hereafter.

TABLE I

Compared physical properties

|  | CR39 ® | Glass Derived From Diacryl 101 | Glass Derived From Diacryl 121 |
|---|---|---|---|
| Shore D Hardness | 84 | 89 | 84 |
| Vickers Hardness (N/mm$^2$) | 215 | 490 | 230 |
| Elastic Modulus in GPa | 3.34 | 5.30 | 3.40 |
| by DMA | 3.17 | 5.10 | 3.34 |
| by Vickers |  |  |  |
| Glass Transition T$_g$(max t$_{g\delta}$) | 94° C. | 156° C. | 107° C. |
| Refractive Index n$_D^{20}$ | 1.498 | 1.565 | 1.5575 |

One observes that the polymer materials used in the invention at the same time have mechanical properties that are equivalent to or superior to those of CR39®, the reference product, and a clearly higher refractive index values.

Example 2

Same process as Examples 1A or 1B, except that a photochromic coloring agent chosen from the table below is incorporated into the polymerization mixture. The coloring agent is dissolved in the monomer with stirring and slight heating.

Coloring Agents

| COLORING AGENT NO. | FORMULA | NOMENCLATURE |
|---|---|---|
| 1 |  | 1,3,3-Trimethylspiro [2H-indole-2,3'-[3H] phenanthra(9,10b)[1,4] oxazine] |
| 2 |  | 5-Chloro derivative of coloring agent No. 1 |
| 3 |  | 1,3,3-Trimethylspiro [indolino-2,3'[3H]-naphtho (2,1b)(1,4)oxazine] |
| 4 |  | 1,3,3,5,6-Pentamethylspiro [indolino-2,3'[3H]-naphtho (2,1b)(1,4)oxazine] |

-continued

Coloring Agents

| COLORING AGENT NO. | FORMULA | NOMENCLATURE |
|---|---|---|
| 5 | (structure) | 1,3,3-Trimethylspiro[indolino-6'-(1-piperidyl)-2,3'[3H]-napththo(2,1b)(1,4)oxazine] |
| 6 | (structure) | 3,3-Diphenyl-3H-naththo[2,1b]pyrane |

In the photochromic materials or glasses obtained, the times of half-darkening and half-lightening are measured. The light source is a mercury vapor lamp, and the measurement of transmission is done at the wavelength of $\lambda_{max}$ of the coloring agent and at room temperature on a 2-mm-thick sample. Table II below recapitulates the results obtained for various photochromic materials according to the invention.

TABLE II

| Photochromic Glass | Matrix | Tg | Coloring Agent | $\lambda_{max}$ (nm) | Concentration | $t_{1/2}$ Darkening (seconds) | $t_{1/2}$ Lightening (seconds) |
|---|---|---|---|---|---|---|---|
| 1 | Diacryl 101 | 156° C. | 3 | 605 | 0.3% | 3 | 4 |
| 2 | Diacryl 101 | — | 6 | 435 | 0.4% | 4 | 7 |
| 3 | Diacryl 101 | — | 1 | 605 | 0.05% | 5 | 7 |
| 4 | Diacryl 101 | — | 2 | 590 | 0.05% | 7 | 11 |
| 5 | Diacryl 122 | 109° C. | 3 | 605 | 0.3% | 3 | 4 |
| 6 | Diacryl 121 | — | 4 | 605 | 0.2% | 3 | 6 |

The examples above show that, regardless of the type of photochromic compound used, one observes with all the glasses of the invention rapid kinetics of darkening as well as lightening, in spite of the high $T_g$ values of the resins, particularly in the case of Diacryl 101 ($T_g$=156° C.), with the best mode being represented by photochromic glass 1.

Example 3

A photochromic lens with a gray tint is prepared according to the mode of operation of Example 1A, except that one incorporates in the polymerization mixture 0.2 part No. 4 blue coloring agent, 0.025 part No. 5 red coloring agent and 0.20 part No. 6 yellow coloring agent.

The lens obtained has rapid darkening and lightening properties. The kinetics of the three coloring agents used being similar, the lens keeps its neutral gray tint during the process of darkening, as well as that of lightening. The lens has a good photostability with time as shown by the results presented in Table III below, of transmittance measurements before and after 283 hours of exposure at a wavelength of 560 nm (60,000-lux xenon lamp) at 20° C.

TABLE III

| Transmittance | Before | After |
|---|---|---|
| $T_0$ [1] | 84.9% | 82.5% |
| $T_{D15}$ [2] | 26.5% | 28.1% |
| $T_{F5}$ [3] | 72.7% | 71.6% |

$T_o$ corresponds to the initial transmission of the lens.

$T_{D15}$=% transmission at 560 nm after 15 min of exposure under the xenon lamp; thickness of sample: 2 mm.

$T_{F5}$=% transmission at 560 nm after 15 min of exposure and 5 min of lightening in darkness.

Example 4

This example illustrates the variant of the process of the invention consisting of incorporating the photochromic coloring agent by diffusion after polymerization.

One prepares a lens according to the mode of operation of Example 1, and therefore not containing any photochromic coloring agents.

One prepares a solution of 1 g of coloring agent No. 4 in 10 g of tetrahydrofuran. One impregnates a disk of filter paper with the solution thus prepared; one applies the filter to the convex front surface of the lens obtained. One maintains the lens under pressure by means of a mineral glass lens with the same radius of curvature as the plastic lens, and one heats it for 2 hours at 130° C. One separates the components, and stoves the lens obtained for 2 hours at 110° C.

The final lens obtained is photochromic with the following characteristics (measured at $\lambda_{max}$=616 nm).

Initial transmission $T_o$=86.6%

Transmission in the darkened state=13.8%

Half-darkening time $t_{1/2}$=3 sec

Half-lightening time $t_{1/2}$=4 sec

The results obtained (kinetics) are completely comparable to those obtained by incorporation in the matrix beforehand (see Example 2).

It goes without saying that the embodiments described are only examples, and one could modify them, particularly by substitution of equivalent techniques, without consequently leaving the scope of the invention.

What is claimed is:

1. A photochromic transparent organic material comprising:
   an optical quality polymer matrix comprising a polymer selected from the group consisting of (a) homopolymers of ethoxylated bisphenol A dimethacrylate having the following formula (I):

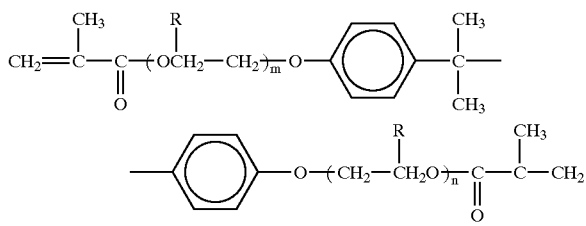

in which R is H or $CH_3$ and m and n independently represent 1 or 2, and (b) copolymers comprising ethoxylated bisphenol A dimethacrylate containing, at most, 30 weight percent of an aromatic monomer bearing vinyl, acrylic, or methacrylic functionality; and
   at least one coloring agent selected from the group consisting of spiroxazines, spiropyrans, and chromenes; wherein said at least one coloring agent is substantially uniformly distributed in said polymer matrix.

2. A photochromic transparent organic material according to claim 1, wherein said material contains a mixture of photochromic coloring agents giving a gray or brown tint to said material in a darkened state.

3. A photochromic transparent organic material according to claim 2, wherein said material comprises, in parts per 100 parts by weight of said polymer matrix, 0.025–0.5 parts of a spiroxazine and 0.05–0.2 parts of a chromene.

4. A photochromic transparent organic material according to claim 1, wherein said at least one coloring agent is selected from the group consisting of 1,3,3-trimethyl-spiro[2H-indole-2,3'-[3H]phenanthra(9,10b)[1,4]oxazine]; 5-chloro derivative of 1,3,3-trimethylspiro[2H-indole-2,3'-[3H]phenanthra(9,10b)[1,4]oxazine]; 1,3,3-trimethyl-spiro[indolino-2,3'-[3H]-naphtho(2,1b)(1,4)oxazine]; 1,3,3,5,6-pentamethylspiro[indolino-2,3'[3H]-naphtho(2,1b)(1,4) oxazine]; 1,3,3-trimethylspiro[indolino-6'-(1-piperidyl)-2,3'-[3H]-naphtho(2,1b)(1,4)oxazine]; 3,3-diphenyl-3H-naphtho[2,1b]pyrane; and mixtures thereof.

5. A photochromic transparent organic material according to claim 1, wherein R is H, and m=n=1.

6. A photochromic transparent organic material according to claim 1, wherein R is H, and m=n=2.

7. A photochromic transparent organic material according to claim 1, wherein R is $CH_3$, and m=n=1.

8. A photochromic transparent organic material according to claim 1, wherein R is $CH_3$, and m=n=2.

9. A photochromic transparent organic material according to claim 1, wherein R is H, m=n=1, and said at least one coloring agent is 1,3,3-trimethyl-spiro[2H-indole-2,3'-[3H] phenanthra(9,10b)[1,4]oxazine].

10. A photochromic transparent organic material according to claim 1, wherein said polymer matrix is a copolymer of ethoxylated bisphenol A dimethacrylate containing of up to 30 weight percent of an aromatic monomer selected from the group consisting of divinylbenzene, diallyl phthalate, benzyl methacrylate, benzyl acrylate, naphthyl methacrylate, naphthyl acrylate, and their derivatives substituted on the aromatic nucleus or nuclei by chlorine or bromine.

11. A photochromic transparent organic material according to claim 1, wherein said at least one coloring agent is a chromene.

12. A photochromic transparent organic material according to claim 11, wherein said material comprises a second coloring agent, said second coloring agent being a chromene.

13. A photochromic article comprising a photochromic transparent organic material according to claim 1.

14. An ophthalmic lens comprising a photochromic transparent organic material according to claim 1.

15. An ophthalmic lens comprising a photochromic transparent organic material according to claim 1, characterized in that said lens has a thickness of about 2 mm and exhibits a $t_{1/2}$ lightening in the range of 4–11 seconds.

16. An ophthalmic lens comprising a photochromic transparent organic material according to claim 1, characterized in that said lens exhibits a $t_{1/2}$ darkening in the range of 3–7 seconds.

* * * * *

UNITED STATES PATENT AND TRADEMARK OFFICE
CERTIFICATE OF CORRECTION

PATENT NO.   : 6,399,682 B2                                     Page 1 of 1
DATED        : June 4, 2002
INVENTOR(S)  : Florent et al.

It is certified that error appears in the above-identified patent and that said Letters Patent is hereby corrected as shown below:

Column 9,
Lines 24 and 28, The formula below:

Should be replaced with:

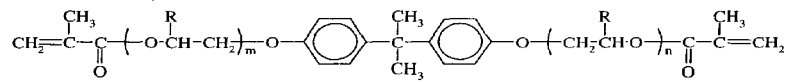

Signed and Sealed this

Twenty-third Day of March, 2004

JON W. DUDAS
*Acting Director of the United States Patent and Trademark Office*